(No Model.)

W. S. LOVELAND & E. C. HENN.
JOURNAL.

No. 470,497. Patented Mar. 8, 1892.

Witnesses:
A. B. Jenkins.
J. Stern.

Inventors:
Walter S. Loveland, and
Edwin C. Henn,
by Harry R. Williams
Atty.

United States Patent Office.

WALTER S. LOVELAND AND EDWIN C. HENN, OF BLOOMFIELD, CONNECTICUT.

JOURNAL.

SPECIFICATION forming part of Letters Patent No. 470,497, dated March 8, 1892.

Application filed August 17, 1891. Serial No. 402,875. (No model.)

*To all whom it may concern:*

Be it known that we, WALTER S. LOVELAND and EDWIN C. HENN, citizens of the United States, residing at Bloomfield, in the county of Hartford and State of Connecticut, have invented certain new and useful Improvements in Journals, of which the following is a full, clear, and exact specification.

The invention relates to the class of journals for spindles and shafts which are capable of adjustment for taking up wear; and the object of the invention is to provide a simple and cheap journal and bearing so constructed that it will not bind or stick when it becomes heated under the rapid rotation of the shaft and which can be quickly and readily adjusted at any time to take up wear of the parts.

Figure 1:
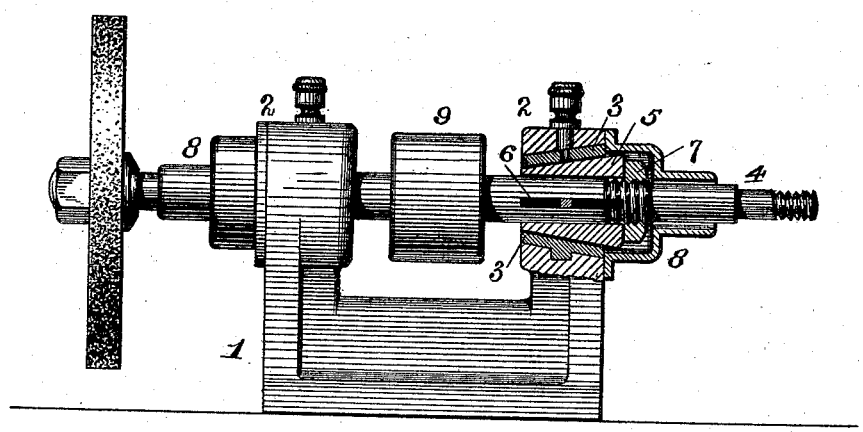
Figure 2:
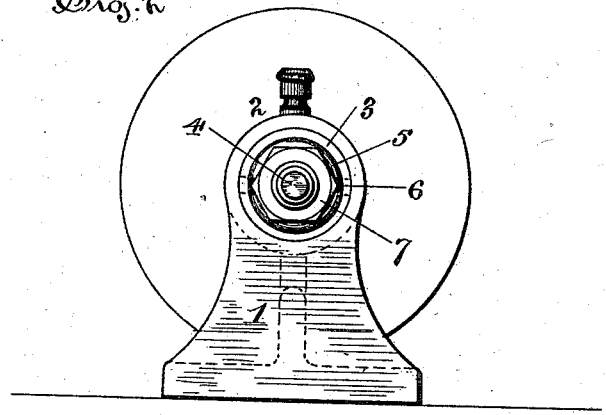

Referring to the accompanying drawings, in which the invention is illustrated as applied to a rapid-running shaft of a grinding or polishing wheel, Figure 1 is a side elevation with parts cut in section to show the construction of the journal and bearing, and Fig. 2 is an end view of the same.

In the views, 1 indicates a bed having at each end a standard in which the journal-bearings 2 are formed. The journal-bearing, which is provided with a conical opening that tapers outwardly from the bearing at the opposite end of the shaft, may be formed directly in the standard, which may be solid or have a removable box, or the bearing may be formed by a lining 3 of different metal from the box, preferably Babbitt or brass, cast or otherwise placed in the box.

The shaft, axle, or spindle 4, which may be of any desirable metal, as machine-steel, is provided with conical collars or journals 5, that fit in the outwardly-tapering bearings. These collars loosely fit upon the shaft, to which they are secured by any common form of spline or feather 6, so that they will rotate with the shaft, but slide freely longitudinally thereon. A portion of the shaft back of the enlarged end of the sliding collar may be threaded and provided with a nut 7, which may be screwed up against the end of the adjacent collar for holding it in place in the bearing, or a pin or wedge may be used for the same purpose. A cap or sleeve 8 may be secured to each standard to protect the journals from dust and grit. Suitable lubricating-openings lead from the exterior through the boxes and lining to the journals, and the shaft is provided with any common means for rotating it, as pulley 9.

The journal-collars are placed in the bearings in the boxes, the shaft slipped through them, and the nuts screwed up against the ends of the collars, forcing and holding them in the bearings with the desired degree of tightness.

As the journals wear away, a slight turn of the nuts force the collars nearer together into the bearing and make the parts tight again. Of course, if desired, one of the journal-collars may be made solid on the shaft and one only made movable to take up the wear. This construction is particularly advantageous for the bearings of fast-rotating shafts of grinding or polishing wheels, because when the shaft journals and boxes become heated under the rapid rotation and the metal expands the shaft lengthens, carrying the collars out of the boxes, so that they may expand radially without binding or sticking and thus interfering with the running of the shaft.

The bed and boxes may be cheaply cast in one piece, and the shaft may be made of any ordinary material, as machine-steel, cheaply drawn to shape without forging or sacrifice of material, as it is provided with large tapering independent interchangeable journals of hard or soft material, as desired, which alone require fine finishing.

The cheap interchangeable journal-collars of any desired material, hard or soft, according to the work required can be readily and quickly renewed when they become damaged or worn beyond adjustment. Of course this journal and bearing can be applied to shafts, axles, and spindles of all kinds and descriptions and is not limited to a bearing for a grinding or polishing wheel.

We claim as our invention—

1. In combination with boxes having fixed bearings tapering toward each other, a shaft and collars thereon which taper toward each other and fit said bearings, the collars being rotarily connected with the shaft and having a free movement toward but held against movement from each other on the shaft by parts connected with the shaft, whereby the latter is free to lengthen to loosen the collars in the bearings, substantially as specified.

2. In combination with boxes having fixed bearings tapering toward each other, a shaft and collars thereon which taper toward each other and fit said bearings, one of said collars being rotarily connected with the shaft and having a free movement toward but held against movement from the opposite collar on the shaft by a part connected with the shaft, whereby the latter is free to lengthen to loosen the collars in the bearings, substantially as specified.

W. S. LOVELAND.
E. C. HENN.

Witnesses:
HARRY R. WILLIAMS,
JOHN P. HEALY.